L. WOLF.
APPARATUS FOR MAKING ICE.
APPLICATION FILED JULY 14, 1909.
1,064,272.
Patented June 10, 1913.
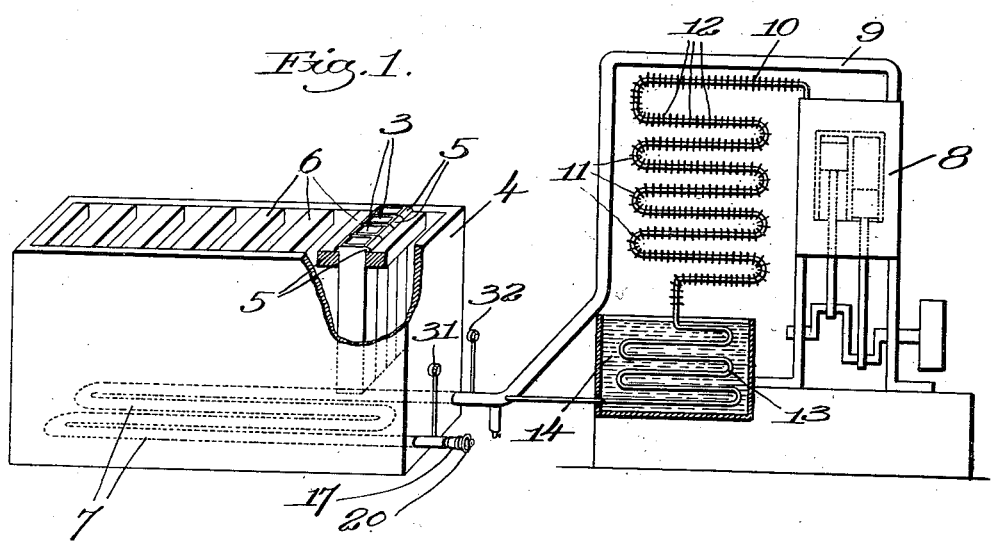
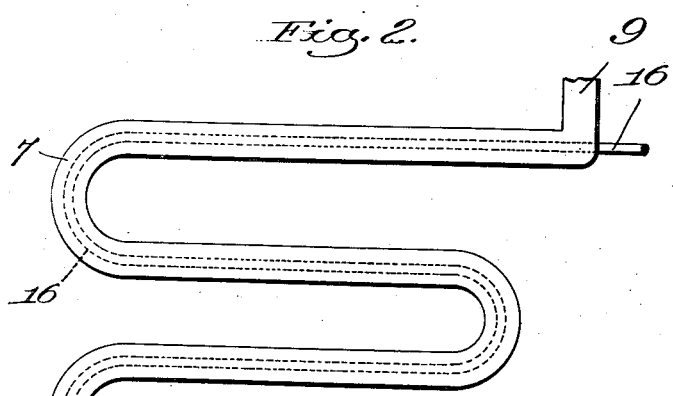
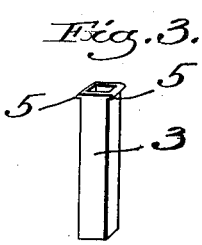
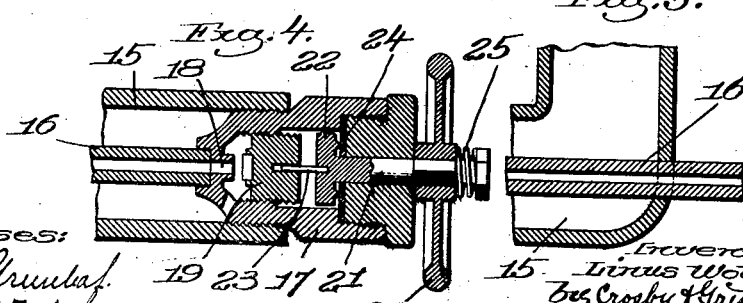

UNITED STATES PATENT OFFICE.

LINUS WOLF, OF ZURICH, SWITZERLAND.

APPARATUS FOR MAKING ICE.

1,064,272.  Specification of Letters Patent.   Patented June 10, 1913.

Application filed July 14, 1909. Serial No. 507,506.

*To all whom it may concern:*

Be it known that I, LINUS WOLF, a subject of the Emperor of Germany, residing at Zurich, Canton of Zurich, Switzerland, have invented an Improvement in Apparatus for Making Ice, of which the following description, in connection with the accompanying drawing, is a specification, like characters on the drawing representing like parts.

This invention relates to an apparatus for making ice by means of a refrigerant having the characteristics of "liquid gas." "Liquid gas" is the term used for designating the product which is produced by the apparatus shown in my Patent No. 909,125, dated January 5, 1909, and it is made by distilling crude oil or other petroleum products to convert them into vapor, and then removing from the vapor all the tar and other heavy products and also all those products which are liquid at normal temperature and atmospheric pressure, and then liquefying the remaining constituents with the exception of the permanent gases. The constituents which comprise liquid gas are gaseous at ordinary temperatures and pressures, but may be liquefied by cooling and the application of a high pressure. Liquid gas will remain in liquid form only when subjected to a high pressure and when the pressure is relieved, it will rapidly vaporize, thus producing an intense cold.

The refrigerating apparatus herein shown is one especially designed for the use of a refrigerant having the characteristics of liquid gas.

I will first describe one apparatus embodying my invention, and will then point out the novel features thereof in the appended claims.

Referring to the drawings, Figure 1 is a more or less diagrammatic view showing an apparatus embodying my invention; Fig. 2 is a detail of the refrigerating coil; Fig. 3 is a view showing one of the vessels for containing the water to be frozen; Fig. 4 is a detail of the valve controlling the expansion of the refrigerating material; Fig. 5 is a detail of the refrigerating coil.

The water to be frozen into ice is contained in receptacles 3 which are adapted to be set into a vat of salt water contained in a tank 4 in usual manner. These receptacles 3 may be sustained in the tank 4 in any appropriate way, and I have herein shown each receptacle as provided with the two lips 5 which rest on cross-bars 6 carried by the tank 4. The tank 4 contains within it a refrigerating coil 7 as usual in refrigerating apparatus. The parts thus far described are such as are commonly found in refrigerating apparatus and do not constitute part of the present invention.

In carrying out my invention, I propose to use a refrigerant having the characteristics of liquid gas as stated above, which is a product that is gaseous at ordinary temperatures and pressures, but may be liquefied by the application of a high pressure and by cooling. The refrigerant when in gaseous form is subjected to the required high pressure by means of a pump 8 of any approved construction, the gaseous refrigerant being delivered to the pump through a supply pipe 9 and being delivered from the pump through a smaller pipe 10. In order to liquefy liquid gas, it is necessary to subject it to a pressure of 80 to 100 atmospheres, and the heat generated by thus compressing the gas is sufficient to raise the temperature of the compressed gas to somewhere in the neighborhood of 400° C. Before the compressed gas is delivered to the tank for refrigerating action, it is liquefied by cooling it while under this pressure and to secure this end, I first subject the heated gas to an air-cooling process, which reduces the temperature thereof materially, and then subject it to a water or other cooling process which completes the liquefaction. The air-cooling process is carried out in a coil 11 which connects with the pipe 10 and which may be provided with the rings or flanges 12 to increase the radiating surface. This coil may be subjected to natural or artificial air currents, and because of the high temperature at which the gases are introduced to the coil, the temperature thereof will be materially reduced by radiation from the coil and radiating flanges or rings 12. From the coil 11 the compressed gases pass into another coil 13 which is immersed in a body of water 14, or some other liquid, for further cooling the gases. The gases become liquid in the coil 13 and are then introduced to the refrigerating coil 7. The refrigerating coil 7 is of special construction, it comprising the exterior pipe 15 of large diameter within which is situated centrally the smaller pipe 16 that connects with the coil 13. The smaller pipe 16 extends the full length of the coil 7 and at the end thereof it is provided with a suitable valve mechanism which controls the communication between the pipe 16 and the interior of the pipe 15. While any suitable valve for this purpose may be used, I have herein shown one comprising the valve casing 17 which screws into and closes the end of the pipe 15, and which is provided with a port 18 that is controlled by a valve 19, and communicates with the pipe 16. The valve 19 is shown as having screw-threaded engagement with the interior of the valve casing 17 and it is operated by a suitable handle 20 which is secured on a stem 21 that carries at its inner end a head 22. The head 22 carries a fin 23 that fits into a groove formed in the head 19 so that when the handle 20 is turned, the valve 19 will be screwed toward and from its valve seat. The head 20 is yieldingly held against a packing member 24 by a spring 25, and thus any leakage of gas around the stem 21 is prevented. The refrigerating coil 7 connects with the supply pipe 9 leading to the pump 8.

In using the apparatus the valve 19 is open so as to permit the liquefied gas to pass from the pipe 16 into the pipe 15 where such liquefied gas vaporizes due to the reduction of pressure. The vaporization of this gas produces an intense cold in the refrigerating coil which causes the water in the receptacles 3 to be quickly frozen. The vapor within the pipe 15 is drawn through the supply pipe 9 and is again compressed in the pump 8 to from 80 to 100 atmospheres. The compressed gas is then subjected to the air-cooling process in the coil 11 and to water-cooling process in the coil 13 where it becomes liquefied, and the liquid gas passes through the pipe 16, and from the latter to the refrigerating coil through the port 18. The liquid gas may thus be used over and over, and because of its peculiar nature, a much lower temperature can be produced and the ice may be formed much quicker than is possible with the ammonia process now commonly employed in ice-making.

31 and 32 are two gages, one to indicate the pressure within the pipe 16 and the other to indicate the pressure within the pipe 15.

I do not wish to confine the invention to the use of liquid gas, as other refrigerants having the characteristics of liquid gas might be employed.

Having fully described my invention, what I claim as new and desire to secure by Letters Patent is:—

1. The combination with a compressor to highly compress a refrigerant, of means to air cool the compressed refrigerant, a water-cooling coil to receive the air-cooled refrigerant and further cool and thereby liquefy the same by water-cooling process, a refrigerating coil, means to admit the liquefied refrigerant to the refrigerating coil wherein it is expanded and thereby produces a refrigerating effect, and means to return the expanded refrigerant to the compressor.

2. In a refrigerating apparatus, the combination with a refrigerating coil, a pipe for delivering the compressed refrigerant thereto, said pipe extending through the refrigerating coil from one end to the other thereof, means at one end of said pipe to deliver refrigerant thereto, a valve at the other end of the pipe for controlling the delivery of the refrigerant to the interior of the refrigerating coil, and means exterior to said coil for operating the valve.

In testimony whereof I have signed my name to this specification in the presence of two subscribing witnesses.

LINUS WOLF.

Witnesses:
LENNART OKESSON,
CARL GUBLER.